July 28, 1953  H. T. FAUS  2,647,033
SPARK STYLUS RECORDING APPARATUS
Filed June 11, 1952  2 Sheets-Sheet 1

Inventor:
Harold T. Faus,
by Russell A. Warner.
His Attorney.

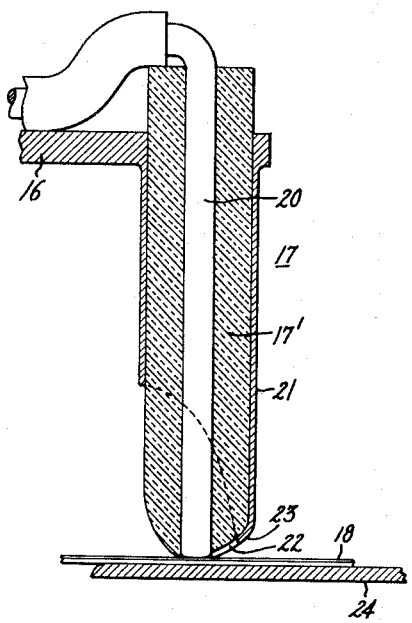
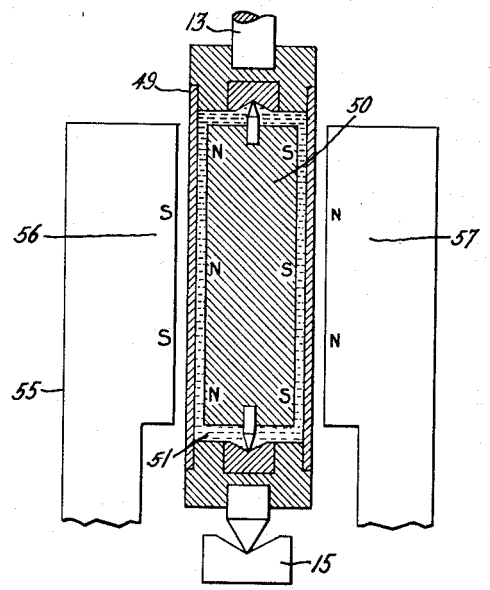
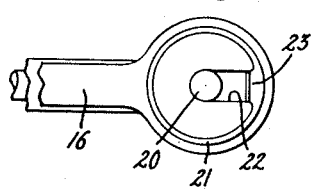
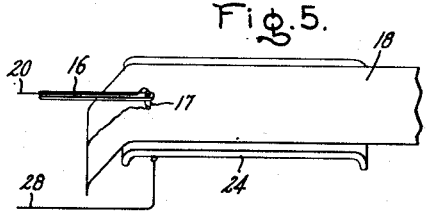
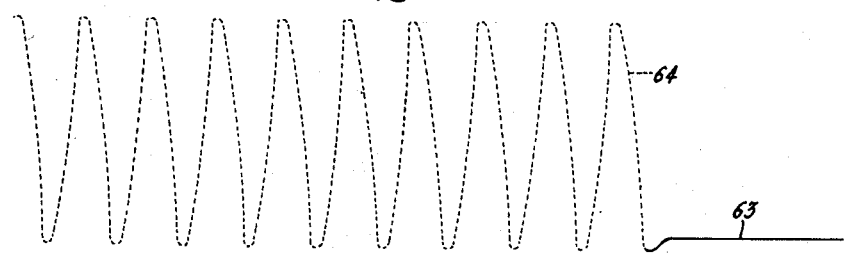
Inventor:
Harold T. Faus,
by Russell A. Warner.
His Attorney.

Patented July 28, 1953

2,647,033

UNITED STATES PATENT OFFICE 2,647,033

SPARK STYLUS RECORDING APPARATUS

Harold T. Faus, Lynn, Mass., assignor to General Electric Company, a corporation of New York Application June 11, 1952, Serial No. 292,925

10 Claims. (Cl. 346—74)

1

My invention relates to recording apparatus of the type employing a stylus which produces a succession of electric sparks and records on a spark sensitive recording paper, preferably of a type that is sensitive to the heating produced by the spark. An important object of my invention is to reduce friction between the recording stylus and recording paper while producing clear, accurate records at various recording speeds. Another object of my invention is to vary the spark intensity and frequency in response to changing recording speeds as required for optimum spark recording conditions.

Figure 1:
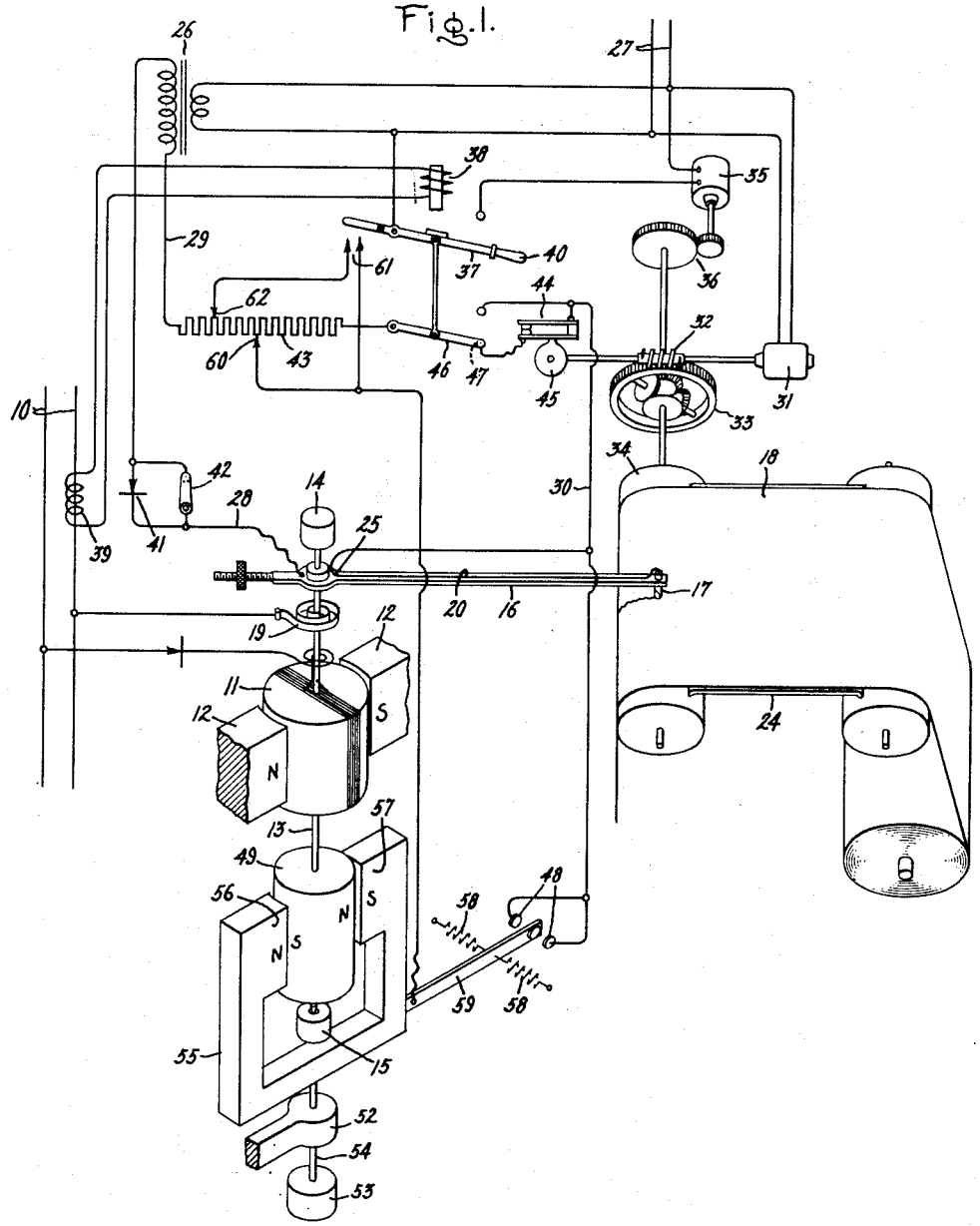
Figure 7:
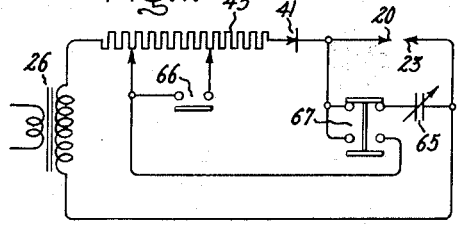

The features of my invention which are believed to be novel and patentable will be pointed out in the claims appended hereto. For a better understanding of my invention, reference is made in the following description to the accompanying drawings in which Fig. 1 represents the essential elements of recording apparatus embodying my invention with means for varying the intensity and frequency of the recording stylus sparks in response to changing recording speeds. Figs. 2 and 3 are side section and recording end views of a preferred form of a two-electrode sparking stylus where the sparking occurs on the recording side of the paper. Fig. 4 shows details of an instrument damping spark control feature. Fig. 5 shows an embodiment where the recording sparks pass through the recording paper. Fig. 6 shows the character of record obtained when employing a two-electrode recording stylus of the type shown in detail in Figs. 2 and 3. And Fig. 7 represents a modified spark energy control circuit employing a condenser.

In my United States Patent No. 2,454,966—November 30, 1948, assigned to the same assignee as the present invention, I have described recording apparatus employing a heat and pressure sensitive recording paper of the character described in United States Patent No. 2,299,991—October 27, 1942, to Kallock. I may use such recording paper in the present invention, although it is quite unnecessary that the recording paper be pressure sensitive, since I may use any recording paper sensitive only to heat.

The recording apparatus of my prior patent above referred to has certain limitations. The stylus pressure required for good recording limited its use for instruments having substantial torque. Heating was obtained by using a heated stylus and preferably a heated platen, and as thus used, the stylus temperature had to be kept below the point at which there would be burning of the recording paper at zero recording

2 speed. This did not give sufficient heating for good recording at high recording speeds, such as relative movement between stylus and paper of the order of four inches per second. No provision was made for changing the heating or pressure in response to variations in recording speed.

According to the present invention no stylus pressure is required, and hence, a high sensitivity, low torque instrument may be used. The necessary localized heating is produced by electric sparks at the tip of the stylus in contact with the recording paper providing an intense source of heat confined to the point where, and at the instant, required. There is no necessity of heating the stylus or platen, and the intensity and rapidity of sparking are easily controlled.

Referring now to Fig. 1, I have here represented a recording voltmeter. The voltage of a power line 10 is measured by a high sensitivity voltmeter having a moving coil armature 11 and a stationary field magnet 12. The armature and its shaft 13 are held by upper and lower bearings at 14 and 15. The shaft carries a recording arm 16 having a stylus 17 at its end for recording on the moving chart 18. A spiral spring or springs 19 moves the armature and parts attached thereto to a zero measuring and recording position when the voltage to be measured is zero, and the armature and parts attached thereto are deflected away from such zero position against the torque of spring 19 by an amount proportional to the voltage measured when voltage is applied. The quantity measured and the type of the measuring instrument used are unimportant so far as my invention is concerned, and a voltmeter has been used for illustration purposes only.

The recording paper 18 may be any suitable paper which is marked or colored in a satisfactory manner in response to heat, and I have used the recording paper described in Kallock Patent No. 2,299,991 with good results as will be described herein. Such paper may consist of a black or dark colored foundation or backing paper covered by a thin recording surface of light colored lacquer. Such surface layer is normally opaque but may be rendered transparent by heating, making visible the darker base paper where the heating is applied and thus produce a record.

A preferred form of heating stylus is represented at 17 in Fig. 1 and shown more in detail in Figs. 2 and 3, and consists of a quartz tube 17' containing a central wire 20 preferably of tungsten. The quartz tube is held in a tubular aluminum shell 21 formed at right angles to and at the outer end of the recording arm 16. The lower or stylus end of the quartz tube 17 is rounded and made even with the lower end of the wire 20 to form a smooth engagement surface with the recording chart. A shallow radial slot 22 is cut in the rounded end surface of the quartz tube 17' on one side, exposing the side of the tungsten wire 20 at its lower end. The lower end of shell 21 is cut away on one side to form a tip at 23 dimensioned to be bent part way into the slot 22 in spaced relation with the exposed side of wire 20. The spaced adjacent surfaces of wire 20 and tip 23 form the electrodes of a spark gap closely adjacent to, on the same side of, and just above the recording paper 18. When electric sparks are produced across this gap with the stylus lightly touching the chart 18, a small localized area of intense heating is produced which melts the upper white recording surface of the chart at the point between the electrodes and exposes the dark lower backing layer of the chart paper as a small sharply defined dot record. It is seen that there is no necessity for any appreciable contact pressure between the stylus and record sheet, since the recording function does not depend upon pressure but merely a close spacing relation of the sparking electrodes to the paper. There is no necessity of heating the platen indicated at 24 or the stylus, although that part of the stylus immediately adjacent the spark gap may become heated by the sparks to some extent.

The heating produced by the sparks is made such as to avoid burning through the chart when the chart and stylus are stationary, but ample to produce clear records at ordinary recording speeds. It will be evident to electrical engineers that the energy and resultant heating produced can be controlled over a wide range as by variation of the sparking voltage and current, the spacing between the electrodes, the spacing between the electrodes and paper, and the duration and frequency of sparking from a practically continuous arc to a few short sparks per minute or longer. The aluminum stylus arm 16 is made one of the conductor leads to the sparking electrodes, and the other lead comprises the wire 20 which is suitably insulated from the arm 16. The connecting lead portion of the wire 20 will preferably be made of copper. Connections to the source of supply are by flexible connections near the axis of rotation of the instrument as indicated at 25 in Fig. 1.

The source of voltage for producing the recording arc or spark is represented in Fig. 1 as being a step-up transformer 26 supplied from a commercial source of alternating current 27 which for present purposes may be assumed to be 110 volt 60 cycles. One lead 28 from the high voltage secondary winding of the transformer goes to stylus arm 16 and hence to the sparking electrode 23 (see Fig. 2). The other side of the circuit 29 preferably includes features for controlling the intensity and frequency of the recording spark in response to changing recording speeds to be explained and then connects to the center stylus wire 20 through conductor 30.

A variable speed drive is provided for driving the chart at two different speeds. For ordinary slow chart speeds the drive is represented as an electric timer motor 31 driving through a worm gear 32 to one side of a differential 33 to the chart advancing drum 34. For driving the chart at higher speeds under unusual conditions, such as during the occurrence of surges, a second electric timer motor 35 is provided which drives through spur gearing 36 to the other side of differential 33 and thence to the drum 34. Normally the high speed chart motor 35 is deenergized at a switch 37 but under emergency conditions this switch may be closed by a relay 38 in response to some emergency condition, as for example, a high current surge on the power line 10 of which the voltage is being recorded. For this purpose relay 38 is connected to be energized from the current transformer 39. The relay is adjusted to pull in and close switch 37 only when the current in line 10 approaches a short circuit current value. When switch 37 is thus closed, both chart driving motors are in operation and the chart is driven at some desired higher than normal rate of speed. Hence, the rapid fluctuation in voltage that is likely to occur under such conditions is recorded in an expanded fashion to make it more clearly readable. The switch operated by relay 38 is also represented as having a handle 40 to indicate that it may be operated by hand, if desired, for testing or other purposes.

When the spark gap is fed from a sixty-cycle alternating current source, its natural sparking frequency will be 120 sparks per second. This may be cut down to 60 sparks per second by including a half-wave rectifier 41 in the energizing circuit by opening the switch 42. The sparking rate may also be varied automatically in response to changes in chart speed, or in response to a rapid change in the measurement being recorded, or both.

For normal, slow recording speeds the sparking voltage, and hence the spark energy, are reduced by including a current limiting resistance 43 in the circuit. Also, the sparking rate is reduced by including a circuit opening and closing switch 44 in the circuit, the switch being operated by a cam 45 driven by the slow speed chart advancing motor 31. Under these conditions the circuit to the center electrode of the sparking stylus will be from lead 29 through resistance 43, a switch 46 normally resting on its lower contact 47, contacts 44, wire 30 to the wire 20. The purpose of switch 46 is to short circuit the cam operated switch contacts at 44 whenever the chart is driven at high speed by motor 35, and for this purpose I have used relay 38 for operating switch 46. Thus, in case the chart speed is increased either by manual or automatic control, due to the interlock with switch 46, the sparking rate is increased from that determined by cam 45 to 120 or 60 sparks per second.

Another operation that will increase the recording speed, that is, the rate of travel of the stylus relative to the chart, is sudden appreciable fluctuations in the measurement being recorded and a corresponding rapid movement of the stylus arm crosswise of the chart. When this happens I have provided contacts at 48 controlled by the measuring instrument for short circuiting contactor 44 and also cutting out a portion of the resistance 43. A lower portion of shaft 13 of the measuring instrument is enlarged in diameter as shown at 49 and is made hollow. (See Fig. 4.) Freely pivoted in the shaft cavity thus formed is a cylindrically shaped permanent magnet 50 polarized across its diameter. This permanent magnet is coaxial with the axis of rotation of the shaft 13 and the enlarged portion 49 thereof, as more clearly shown in Fig. 4. The remainder of the cavity chamber 49 is filled with a damping fluid 51, such as silicone oil. Rotatively supported coaxial with shaft 13 in bearings 52 and 53 on a shaft 54 is a U-shaped magnetic polar stator structure 55 having pole pieces 56 and 57 closely symmetrically spaced from and on opposite sides of the cavity chamber 49. The side wall of this cylindrical shaft cavity chamber is made of nonmagnetic material. The structure shown in Fig. 4 is claimed in my copending application Serial No. 146,748, filed February 28, 1950, now Patent 2,622,707 issued December 23, 1952, and assigned to the same assignee as the present invention.

The polar structure will therefore cause the polarized inner rotor 50 to align its magnetic axis with pole pieces 56 and 57 and if the outer polar structure is held from rotation, the inner polar rotor 50 will likewise resist rotation. This arrangement is useful as a damper for the measuring instrument armature and shaft since when shaft 13 rotates, the liquid within 49 will tend to rotate 50 also, but if 50 is withheld from rotation, friction liquid damping between the inner wall of 49 and the outer surface of 50 will result. In the present device the outer polar structure of the damper is pivoted but turning is resiliently resisted as by the springs shown at 58 fastened between stationary supports and a contact arm 59 fixed to 55, and extending radially from the axis of rotation of 55 between the contacts at 48. The torque and spring relation are made such that for slow rotary movements of the armature of the measuring instrument, 55 does not deflect and holds inner rotor 50 from rotation but for sudden rotary movements of the measuring instrument armature, the damping friction causes some turning of rotor 50 and some following rotary movement of the outer stator structure 55 resisted by springs 58. A small deflection of contact arm 59 from its biased position midway between closely spaced contacts 48 causes a closure of the tip of such arm against one of the contacts. It is thus seen that the arrangement serves as an effective damper for the measuring instrument and can be and is used to operate control contacts whenever the recording speed exceeds a given amount due to fluctuation in the quantity being measured. When contact is made at 48, it closes a circuit between wires 30 and 16 and an adjustable tap 60 on resistance 43, and hence, a portion of such resistance and the contacts at 47 and 44 are short circuited. This impresses a correspondingly higher and more frequent available sparking voltage across the stylus electrodes substantially concurrently with any sudden deflection of the measuring instrument and maintains this condition as long as the higher than normal deflection of the instrument and recording arm persists. When the deflection slows down, friction damping in chamber 49 decreases, the torque between 50 and 56 decreases, and the springs at 58 open the contacts 59—48, and normal, slow recording speed conditions are re-established. The increase in spark energy and spark current caused by reducing the resistance in the sparking circuit is adjusted to obtain sufficient recording heat to produce clear records at the higher recording speed.

It will be evident that the instrument deflection control obtained by the closing and opening of contacts 48—59 is effective to increase and decrease the stylus electrode sparking current irrespective of whether the chart is being advanced at high speed by motor 35 or not. Ordinarily, the controls already described will be sufficient. However, in special cases where it is important to obtain the clearest possible records of surge current conditions and when both the chart and stylus are moving at high rates and the recording speed is exceptionally fast, I may provide for a still higher spark energy only under these conditions. For this purpose I have provided for closure of a pair of contacts at 61 upon the occurrence of a surge condition or otherwise when the high speed motor 35 is driving the chart at high speed. These contacts are closed by an insulated extension of the movable arm of switch 37 whenever this latter switch is closed. Contacts 61 when thus closed connect the wire leading from contact 60 to contact 59 to an adjustable tap 62 on resistance 43. If the contacts 48—59 are open when contacts 61 are closed, the result will be to cut out that section of the resistance between taps 60 and 62 which will increase the spark energy somewhat. However, if contacts 48—59 are closed when contacts 61 are closed, the result will be to cut out all of resistance 43 to the right of tap 62 to obtain the highest of the several stylus electrode spark energy values provided for. The best combination of such values will of course vary with recording conditions and may be readily adjusted, and some of the controls may be omitted as conditions warrant.

It is seen that I have provided means for controlling the spark energy available at the electrodes in proportion to the recording rate by controlling the spark frequency or the spark intensity or both in response to chart speed and lateral stylus speed, and by a combination of such speeds to control the average energy and heat available for recording purposes in proportion to the resulting recording speed as required for good recording, and that such controls are readily adjustable and one or more may be omitted if not required. A spark rate control rectifier, such as is shown at 41—42, may be embodied in the automatic control as, for example, by replacing the cam 45 and contacts 44 with a rectifier to be cut in and out by the automatic switch 46 which, as is noted, is also subject to manual control by handle 40.

In Fig. 6, I have shown a reproduction of a record taken by the apparatus described without automatic control and with no interrupter, such as shown at 45 and 41 in the circuit. This record was obtained with the chart moving at one inch per second. With the stylus stationary a solid black line record as at 63 is obtained. With the stylus moving back and forth across the record sheet at the approximate rate of seven inches per second the dotted portion of the record as at 64 is obtained. The record thus obtained is quite sharp and clear, although the dotted portion is not so dark as the solid portion. The heating produced by the stylus, while sufficient to make a solid black line record at 63 where the heating effect produced by successive sparks overlaps, is not sufficient to burn or weaken the recording paper.

One advantage of the apparatus illustrated in the dotted line portion 64 is that the dot spacing represents one-half cycle of time duration of the frequency of the source of supply used. Thus, with a 60-cycle source the dot spacing corresponds to $\frac{1}{120}$ second in time, which enables any part of the dotted line portion of such a record to be accurately analyzed in relation to time. The contactor 44—45 or the like is desirable primarily where, for example, we have a chart speed variation of from, say, three inches per hour to three inches per minute. At the slower chart speed a solid line record is obtained with the stylus stationary if the sparking circuit were opened most of the time and closed, say, about one second out of every 60 seconds. Then for the faster chart speed the contactor 44—45 is short circuited as previously described. The two solid clear records thus obtained are substantially identical and the chart is not burnt or damaged. The control of spark intensity by variation of the resistance 43 in response to the character of instrument deflection is primarily desirable where there is likely to be an occasional sudden fluctuation in the quantity being recorded and clear records thereof are desired. This may mean an increase from normal recording speed conditions between chart and stylus by a factor of 1000. Under such conditions the spark intensity suitable for recording at the low recording speed without burning the paper will not be sufficient for good recording at the high recording speed, unless the spark intensity and heating are substantially increased as in accordance with my invention.

In Fig. 5, I have represented a spark recording arrangement of having the spark penetrate the record sheet 18 from the stylus 17 to the metal platen 24 beneath the record sheet. My invention may be used in this way. The only essential change necessary from Fig. 1 is to connect wire 28 to the platen 24 instead of to the recording arm 16. The sparks will then penetrate the chart, also rendering transparent the upper coating, and leave a fairly good record. The record obtained by having the sparks penetrate the paper will ordinarily not be quite so satisfactory as those obtained with the spark electrodes both on the recording side of the paper, because once the spark penetrates the paper, subsequent sparks tend to go through this same hole until there is sufficient movement between chart and stylus to make it easier for the spark to make a new hole. Hence, the record tends to be somewhat irregular. For these reasons the embodiment first described in connection with Figs. 1 and 3 is to be preferred.

The recording paper which I have used has a very thin surface coating layer of nitrocellulose with a plasticizer on a slow burning heavier paper base. The coating is so thin that it will not burn rapidly because its heat of combustion is quickly absorbed by the slow burning paper base. When the surface temperature is raised instantaneously by the exposure to or passage of an electric spark, the nitrocellulose decomposes and becomes transparent immediately, exposing the black coating underneath. Due to the cooling effect of the paper, this decomposition extends very little beyond the small area exposed to or traversed by the spark. Hence, quite sharply defined fine line records are produced. The stylus which I have used had a quartz tube about 0.015 inch inside diameter with a 0.015 inch wall, and the other dimensions proportioned about as represented in Fig. 2. Good recording results have been obtained with a spark current of from 0.5 to 1.5 milliamperes, with a voltage of from 2000 to 3000 volts. The transformer used at 26 should have high impedance or other means used to limit the current.

Fig. 7 represents a modified form of spark energy control circuit where a condenser 65 may be connected across the spark electrodes 20 and 23, the condenser being chargeable at selected rates through adjustable portions of a resistance 43 and a rectifier 41 from the high voltage supply transformer 26. Recording rate responsive switching means 66 and 67 are provided for varying the energy available across the electrodes primarily by changing the sparking rate. When both switches 66 and 67 are in the position shown, the condenser 65 is charged at a slow rate through rectifier 41 and all of the resistance 43, and the condenser is adjusted or designed to produce the slowest desired spark rate and current across the electrodes. When switch 66 is closed, a desired selected portion of the resistance is cut out and the condenser charges faster and the sparking rate is increased. When switch 67 is moved to the upper position, the rectifier is short circuited, condenser 65 is cut out, and the electrodes are connected across the A.-C. supply through a suitable current limiting portion of the resistance, at which time the sparking rate is increased to that corresponding to twice the frequency of the alternating current supply. It will be understood that the switches 66 and 67 will be operated in response to recording rate changes as required, as explained in connection with Fig. 1.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Recording apparatus in which the recording rate is subject to variation, comprising means for movably supporting a record sheet, such sheet being of a type on which a record may be reproduced by localized heating, means for moving said record sheet, an instrument having a recording arm movable relative to said record sheet, a stylus member carried by said arm and resting lightly on the record sheet, spaced electrodes across which an electric spark may be produced, at least one of said electrodes being located on said stylus closely adjacent to the record sheet such that when an electric spark passes between the electrodes it produces a record on the closely adjacent portion of the record sheet, a source of electric sparking voltage, connections from said source to said electrodes, switching means included in said connections for varying the average electric spark energy available at said electrodes, and means operating substantially concurrently with increases and decreases in the recording rate for actuating said switching means to make corresponding changes in the available record producing spark energy, such that clear records are produced without destructive burning of the chart.

2. Recording apparatus in which the recording rate is subject to variation, comprising means for movably supporting a record sheet, the record sheet being of a type on which a record may be produced by localized heating, means for driving the record sheet at different rates, an instrument having a recording arm movable over the record sheet, a stylus on said arm bearing lightly on the record sheet, a pair of electrodes across which an electric spark may be produced, at least one of said electrodes being carried by said stylus closely adjacent to the record sheet such that a record is produced when a spark passes between said electrodes, a source of sparking voltage for said electrodes, connections between said source and electrodes, switching means in said circuit connections for varying the electric energy available at said electrodes, a control for the record sheet driving means to increase and decrease the rate at which the record sheet is moved, said switching means and record sheet rate control being interlocked such that the average electric spark energy is increased and decreased substantially simultaneously with the increase and decrease in the rate of record sheet movement.

3. Recording apparatus of the type employing a heat sensitive movable record sheet, an instrument having a recording arm movable over said record sheet, a stylus carried by said arm and resting lightly against the record sheet, a pair of spaced electrodes at least one of which is positioned on said stylus closely adjacent the record sheet, a source of electric supply connected to and for producing electric sparks between said electrodes, control means associated with the supply connections to said electrodes for varying the electric energy available at said electrodes, said instrument by its deflection causing the recording arm and stylus to move relative to said record sheet at varying rates of speed, and means operated in response to the rate of the last-mentioned movement for operating said electrode energy control means to increase and decrease the electric energy available at the electrodes as the rate of deflection of the instrument increases and decreases.

4. Recording apparatus of the type employing a heat sensitive movable record sheet, an instrument of the deflection type having a recording arm movable relative to the record sheet and carrying a stylus bearing lightly on the record sheet, a pair of electrodes at least one of which is on said stylus closely adjacent to said record sheet for producing records by reason of heating when sparks pass between said electrodes, an electric supply source and connections therefrom to said electrodes for furnishing electrode sparking energy, said connections including a spark rate control interrupter and a spark current reducing impedance and contacts controlled in response to the rate of deflection of said instrument for short circuiting said interrupter and resistance only when the rate of deflection of said instrument exceeds a predetermined amount.

5. Recording apparatus of the type in which the record is made on a heat sensitive record sheet, comprising means for advancing the record sheet at a plurality of different rates, a stylus resting on and movable relative to said record sheet at varying rates such that the resultant recording rate varies over a wide range, a pair of electrodes across which an electric spark is produced, at least one of said electrodes being mounted on said stylus in close proximity to the record sheet whereby the heat from sparks passing between the electrodes is capable of producing records on such sheet, a voltage source for supplying electric spark energy to said electrodes, a circuit connecting said source to said electrodes, a spark rate control means in said circuit, a spark current reducing impedance in said circuit, and switching means for short circuiting both of said control means.

6. Recording apparatus of the type in which records are produced on a moving heat sensitive record sheet, comprising a recording stylus resting on and movable relative to the record sheet at various rates, a pair of spaced electrodes across which sparks may be produced, at least one of said electrodes being on said stylus closely adjacent to the record sheet such that sparks between the electrodes produce records on the sheet by heating, a source of spark voltage connected to said electrodes and means responsive to the relative rate of movement between said stylus and the record sheet for increasing and decreasing the electric sparking energy available at said electrodes as the recording rate increases and decreases within such limits as to prevent destructive burning of the record sheet when the recording rate is slow and to produce satisfactory records when the recording rate is high.

7. Recording apparatus of the type wherein a heat sensitive record sheet is employed, a two speed driving means for moving the record sheet, a stylus moved relative to the record sheet and resting lightly thereon, said stylus carrying at least one of a pair of electrodes located closely adjacent to such sheet and by means of which records are produced by heating when electric sparks pass between said electrodes, a source of energy connected to said electrodes, a current interrupter included in the connections, said interrupter being driven by the record sheet driving means, means for short circuiting said current interrupter, and means for changing the speed of the sheet driving means from low to high speed and vice versa, said short circuiting and speed changing means being interlocked to cause the short circuiting of the interrupter simultaneously with the change from low to high speed.

8. In recording apparatus of the type employing a heat sensitive record sheet, two speed motor means for advancing the sheet at different rates, a stylus resting lightly on the record sheet, a deflection type instrument for moving said stylus relative to said sheet at various rates, a pair of spaced spark electrodes carried by said stylus closely adjacent the record sheet, a source of supply for producing electric sparks between said electrodes, connections between said source and electrodes including a continuously operated current interrupter, a pair of short circuiting devices for said interrupter one of which is operated to short circuit the interrupter when the two speed motor means is changed from low speed to high speed, and the other of which is operated when said instrument deflection rate exceeds a predetermined amount.

9. In recording apparatus of the type in which records are produced by localized heating on a heat sensitive record sheet, two speed driving means for moving said record sheet at different rates, a stylus resting lightly on the record sheet, a deflection type of instrument for moving said stylus relative to said record sheet at varying rates, a pair of electrodes spaced apart on said stylus closely adjacent to said record sheet, a source of electric supply for producing sparks between said electrodes, connections between said source and electrodes including a continuously operated interrupter and a current limiting resistance, a short circuiting device for said interrupter operated when the chart driving means is changed from low speed to high speed, and a short circuiting device for said interrupter and a portion of said current limiting resistance operated whenever the deflection of said instrument exceeds a predetermined rate.

10. In recording apparatus wherein the record is made on a heat sensitive moving record sheet, a stylus resting lightly on said record sheet, a deflection type instrument for moving said stylus relative to said record sheet at various rates, a pair of electrodes spaced apart on said stylus closely adjacent said record sheet, a source of supply for producing electric sparks between said electrodes, connections between said source and electrodes including means for varying the electric energy available at said electrodes, magnetic damping means for said instrument including a magnetic stator member having its axis of rotation coaxial with said instrument and resiliently restrained against rotation in either direction from a normal position but forced to rotate from said position only in response to higher than normal rates of deflection of said instrument, and switching means operated in response to the forced rotation of said stator member from its normal position for controlling said electric energy varying means to increase the electric spark energy available at said electrodes when the deflection of said instrument exceeds a predetermined rate.

HAROLD T. FAUS.

References Cited in the file of this patent

UNITED STATES PATENTS

| Number | Name | Date |
|---|---|---|
| 2,404,975 | Mathes | July 30, 1946 |